US012678985B2

(12) United States Patent
Chang

(10) Patent No.: US 12,678,985 B2
(45) **Date of Patent: *Jul. 14, 2026**

(54) RAZOR CARTRIDGE

(71) Applicant: DORCO CO., LTD., Gyeonggi-do (KR)

(72) Inventor: Jun Soo Chang, Seoul (KR)

(73) Assignee: DORCO CO., LTD., Yongin-si (KR)

( * ) Notice: Subject to any disclaimer, the term of this patent is extended or adjusted under 35 U.S.C. 154(b) by 519 days.

This patent is subject to a terminal disclaimer.

(21) Appl. No.: 17/905,914

(22) PCT Filed: Mar. 9, 2021

(86) PCT No.: PCT/KR2021/002861
§ 371 (c)(1),
(2) Date: Sep. 8, 2022

(87) PCT Pub. No.: WO2021/182831
PCT Pub. Date: Sep. 16, 2021

(65) Prior Publication Data
US 2023/0166422 A1 Jun. 1, 2023

(30) Foreign Application Priority Data
Mar. 10, 2020 (KR) ........................ 10-2020-0029720

(51) Int. Cl.
*B26B 21/40* (2006.01)
*B26B 21/28* (2006.01)
(Continued)

(52) U.S. Cl.
CPC .......... *B26B 21/4037* (2013.01); *B26B 21/28* (2013.01); *B26B 21/4031* (2013.01); *B26B 21/565* (2013.01); *B26B 21/42* (2013.01)

(58) Field of Classification Search
CPC . B26B 21/28; B26B 21/4018; B26B 21/4025; B26B 21/4037; B26B 21/42; B26B 21/4031; B26B 21/565
(Continued)

(56) References Cited

U.S. PATENT DOCUMENTS 2,165,391 A * 7/1939 Lewis ..................... B26B 21/08 30/31
2,171,880 A * 9/1939 Lewis ..................... B26B 21/42 30/31
(Continued)

FOREIGN PATENT DOCUMENTS

CA 2807480 A1 * 3/2012 ......... B26B 21/4037
DE 202004019038 U1 2/1996
(Continued)

OTHER PUBLICATIONS

Extended European Search Report in Application No. 21766951.4, mailed Nov. 17, 2023, 8 pages.
(Continued)

*Primary Examiner* — Jason Daniel Prone
(74) *Attorney, Agent, or Firm* — Knobbe, Martens, Olson & Bear, LLP

(57) ABSTRACT

Proposed is a razor cartridge. The razor cartridge includes at least one razor blade including a base portion and an edge portion including a cutting edge, at least a portion of the razor blade having a bent region. The razor cartridge also includes a resting base for accommodating the base portion, and a cap for covering at least a portion of the resting base. The razor cartridge further includes a plurality of comb elements extending toward the front of the resting base, at least a portion of the comb elements being disposed forward
(Continued)

of the at least one razor blade. The plurality of comb elements include top surfaces configured to define a shaving plane.

10 Claims, 14 Drawing Sheets

(51) Int. Cl.
*B26B 21/56* (2006.01)
*B26B 21/42* (2006.01)

(58) Field of Classification Search
USPC ..... 30/30, 31, 47–51, 233.5; D28/46, 49, 53
See application file for complete search history.

(56) References Cited

U.S. PATENT DOCUMENTS 2,234,440 A * 3/1941 Lewis .................... B26B 21/08 30/30
2,237,676 A * 4/1941 Lewis .................... B26B 21/08 30/30
3,183,589 A * 5/1965 Szabo .................... B26B 21/08 30/30
3,219,180 A * 11/1965 Rosen .................... B65D 83/10 30/34.2
D205,453 S * 8/1966 Christensen .................... D28/52
3,986,258 A * 10/1976 Liedtke .................... B26B 21/08 30/30
4,335,509 A * 6/1982 Smith .................... B26B 21/28 30/48
4,346,721 A * 8/1982 Molaro .................... B26B 21/12 132/313
4,663,841 A * 5/1987 Custer .................... B26B 21/42 30/30
4,663,843 A 5/1987 Savage
4,854,042 A * 8/1989 Byrne .................... B26B 21/28 30/34.1
D312,144 S * 11/1990 Buba .................... D28/52
4,976,028 A 12/1990 Chen
5,335,417 A * 8/1994 Genero .................... B26B 21/40 30/41.5
5,386,750 A * 2/1995 Morrison .................... B26B 21/42 30/31
5,537,749 A * 7/1996 Cacioppo .................... B26B 21/4012 30/41.5
6,173,498 B1 * 1/2001 Warrick .................... B26B 21/227 30/57
6,263,576 B1 * 7/2001 Drapak .................... B26B 21/28 30/48
6,473,970 B1 * 11/2002 Prochaska .................... B26B 21/443 30/50
6,519,856 B1 * 2/2003 Dischler .................... B26B 21/28 30/48
7,100,284 B2 * 9/2006 King .................... B26B 21/225 30/50
D541,987 S * 5/2007 Sugawara .................... D28/46
D616,147 S * 5/2010 Adams .................... D28/46
D616,606 S * 5/2010 Adams .................... D28/47
D617,497 S * 6/2010 Goodhead .................... D28/47
7,730,619 B2 * 6/2010 Ozenick .................... B26B 21/28 30/49
D630,377 S * 1/2011 Wattam .................... D28/53
7,918,027 B2 * 4/2011 Colthurst .................... B26B 21/28 30/50
7,954,244 B2 * 6/2011 Orloff .................... B26B 21/4018 30/50
8,146,255 B2 * 4/2012 Denkert .................... B26B 21/227 30/49
8,225,510 B2 * 7/2012 Peterson .................... B26B 21/4012 30/41
8,914,980 B2 * 12/2014 Solomennikov .................... B26B 21/28 30/48
9,308,657 B2 * 4/2016 Bruno .................... B26B 21/4012
9,751,226 B2 * 9/2017 Psimadas .................... B26B 21/4037
9,868,220 B2 * 1/2018 Moffat .................... B26B 21/4012
9,919,441 B2 * 3/2018 Drori .................... B26B 21/4018
10,144,142 B1 * 12/2018 Squires .................... B26B 21/4037
10,391,652 B2 * 8/2019 Bruno .................... B26B 21/4012
10,442,097 B2 10/2019 Bozikis
10,780,596 B2 * 9/2020 Squires .................... B26B 21/4037
10,786,914 B2 * 9/2020 Galanis .................... B26B 21/4037
10,836,060 B2 * 11/2020 Squires .................... B26B 21/4037
10,940,597 B2 3/2021 Park et al.
D926,374 S * 7/2021 Washington .................... D28/47
11,173,621 B2 * 11/2021 Squires .................... B26B 21/42
11,400,610 B2 * 8/2022 Moustakas .................... B26B 21/42
D964,653 S * 9/2022 Washington .................... D28/47
11,633,869 B1 * 4/2023 Tammera .................... B26B 21/4012 30/32
11,794,363 B2 * 10/2023 Walker, Jr. .................... B26B 21/42
D1,016,392 S * 2/2024 Washington .................... D28/47
11,919,181 B2 * 3/2024 Van Veldhuizen .................... B26B 19/3826
D1,022,320 S * 4/2024 Fang .................... D28/47
12,064,888 B2 * 8/2024 Son .................... B26B 21/4031
2003/0182802 A1 * 10/2003 Vega .................... B26B 21/28 30/50
2009/0113715 A1 * 5/2009 Goss-Melendez .................... B26B 21/28 30/50
2010/0011586 A1 * 1/2010 Nicoll .................... B26B 21/42 30/34.1
2010/0011588 A1 * 1/2010 Wang .................... B26B 21/4031 30/41
2011/0094108 A1 * 4/2011 Wain .................... B26B 21/4018 30/84
2011/0162208 A1 7/2011 Wain
2011/0162209 A1 7/2011 Wain
2013/0199346 A1 8/2013 Psimadas et al.
2015/0101196 A1 * 4/2015 Bolivar .................... B26B 21/28 30/50
2017/0210020 A1 7/2017 Bozikis et al.
2017/0239826 A1 * 8/2017 Dudkiewicz .................... B26B 21/28
2018/0169879 A1 * 6/2018 Psimadas .................... B26B 21/42
2018/0333879 A1 * 11/2018 Squires .................... B26B 21/4037
2019/0077034 A1 3/2019 Squires et al.
2019/0134833 A1 5/2019 Kole et al.
2019/0202076 A1 7/2019 Park et al.
2019/0299460 A1 * 10/2019 Lechuga .................... B26B 21/4018
2020/0039097 A1 2/2020 Bozikis et al.
2022/0072725 A1 * 3/2022 Drori .................... B26B 21/4037
2023/0120418 A1 * 4/2023 Chang .................... B26B 21/4037

FOREIGN PATENT DOCUMENTS

FR 2612112 A1 * 9/1988 .................... B26B 21/28
KR 20-0166341 2/2000
KR 10-2013-0111549 10/2013
KR 10-2017-0041246 4/2017
KR 10-1876232 7/2018
WO WO 96/02370 A1 8/2005
WO WO 2020/205914 A1 10/2020

OTHER PUBLICATIONS

PCT International Application No. PCT/KR2021/002861, International Search Report dated Aug. 4, 2021, 6 page.
International Search Report issued in International Patent Application No. PCT/KR2021/002860, mailed Aug. 4, 2021 in 6 pages.
Office Action issued in Korean Patent Application No. 10-2021-0000763, mailed on Mar. 17, 2023 in 5 pages.
Extended European Search Report in Application No. 21767985.1, mailed Nov. 17, 2023, 8 pages.
Office Action received in European Application No. 21767985.1 dated Apr. 17, 2025.
Office Action received in European Application No. 21766951.4 dated Apr. 17, 2025.

(56) References Cited

OTHER PUBLICATIONS

Office Action dated Oct. 21, 2025 in European Application No. 21766951.4, in 5 pages.

* cited by examiner

RAZOR CARTRIDGE

CROSS-REFERENCE TO RELATED APPLICATION(S)

This application is the National Stage filing under 35 U.S.C. 371 of International Application No. PCT/KR2021/002861, filed on Mar. 9, 2021, which claims the benefit of earlier filing date and right of priority to Korean Application No. 10-2020-0029720, filed on Mar. 10, 2020, the contents of which are all hereby incorporated by reference herein in their entireties.

TECHNICAL FIELD

The present disclosure relates to a razor cartridge.

BACKGROUND ART

The content described in this section merely provides the background information on the present disclosure and does not constitute the prior art.

Recently, to emphasize masculine beauty or afford a good style, shaving which leaves a certain length of hair without completely cutting the hair is in fashion. This is called stubble shaving, which is distinguished from general shaving completely or almost completely cutting the hair. Currently, various stubble razors for stubble shaving are on the market.

Some of conventional stubble razors are configured to operate electrically. Such a conventional electric stubble razor provides a shaving function in a state where it is connected by an electric wire or in a state where a battery is charged.

To this end, the conventional electric stubble razor includes therein electronic components such as a battery or a small motor. Thus, the conventional electric stubble razor is disadvantageous in that the volume of the razor is large and it is difficult to carry.

Some of the conventional stubble razors are configured to provide a shaving function without electric operation, as in a general wet razor. A cartridge of such a conventional wet stubble razor has a structure in which a base, a straight blade, and a cap are stacked in this order.

To be more specific, the cartridge of the conventional wet stubble razor has a structure in which the straight blade is disposed on the base, and then the cap covers the top of the base. The cap may separate a user's skin from the straight blade. Thereby, the stubble shaving may be implemented.

On the other hand, in order for the hair to be cut by the straight blade, the hair needs to enter the straight blade in an erected state. To this end, some spacing is required between the base and the straight blade. In order to provide this spacing, a separate member called a spacer is disposed between the base and the straight blade.

Such a spacer may be disposed not only between the base and the straight blade but also between a plurality of straight blades. In this case, the spacer may provide some spacing between the plurality of straight blades.

Since the cartridge of the conventional wet stubble razor has the straight blade, it may include the spacer therein. Thus, the cartridge of the conventional wet stubble razor is problematic in that a structure is complicated, and the weight and size of the cartridge are increased.

Further, since the cartridge of the conventional wet stubble razor has a structure in which the base, the straight blade, and the cap are stacked in this order, an overlapping area between a member such as the base or the cap and the straight blade is widened. In this case, due to the widened overlapping area, shaving debris may be caught between the base and the straight blade and between the cap and the straight blade. Such shaving debris may be accumulated because a cleaning operation is not performed smoothly. Thus, this may adversely affect shaving performance, the hygienic condition of the razor, etc.

Therefore, there is a need to develop a new type of wet stubble razor having a simpler and more compact structure.

DISCLOSURE

Technical Problem

Accordingly, the present disclosure is to provide a razor cartridge having a simpler and more compact structure in a wet stubble razor.

Technical Solution

According to at least one embodiment, the present disclosure provides a razor cartridge comprising: at least one shaving blade comprising a base portion and an edge portion including a cutting edge, at least a portion of the shaving blade having a bent area; a receiving base receiving the base portion; a cap covering at least a portion of the receiving base; and a plurality of comb elements, at least some of which are disposed in front of the at least one shaving blade, the comb elements extending toward a front of the receiving base, wherein the plurality of comb elements comprise a top surface configured to define a shaving plane.

Advantageous Effects

In accordance with the embodiment of the present disclosure, a razor cartridge has a simple and compact structure, thus improving productivity and durability.

MODE FOR DISCLOSURE

Figure 1:
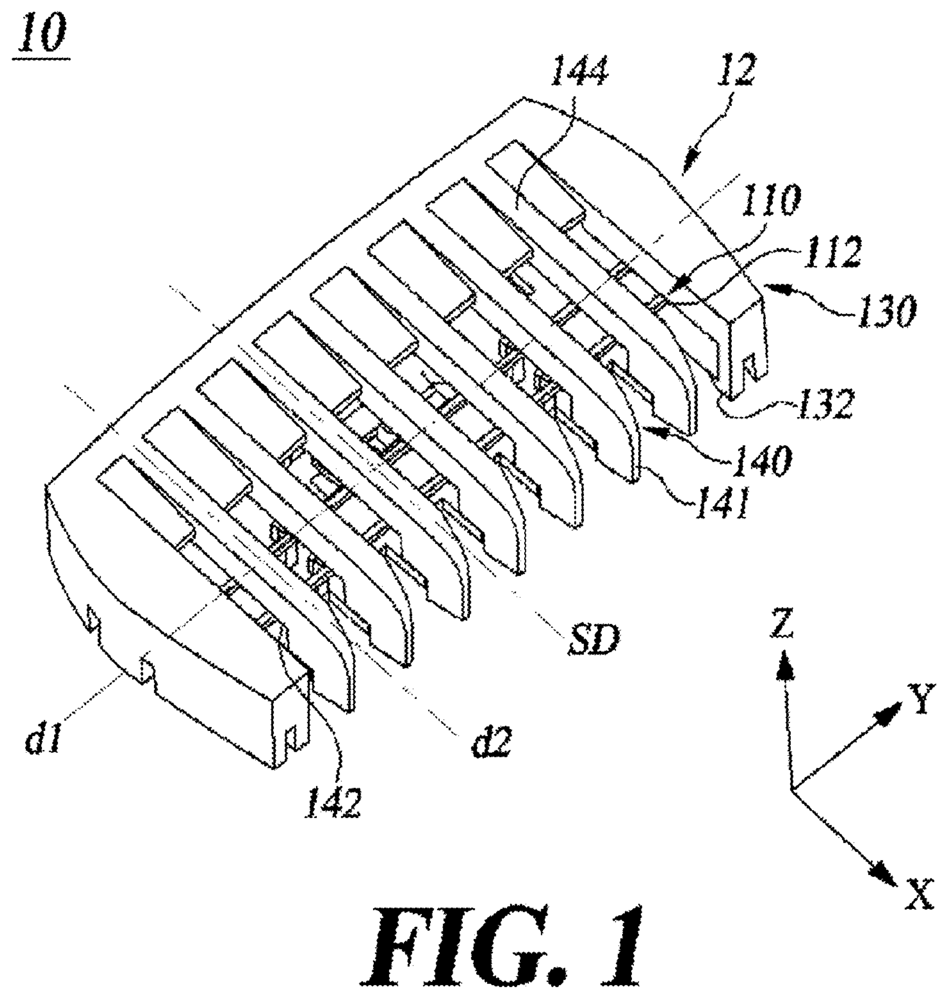
FIG. 1 is a perspective view illustrating a razor cartridge according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts “include” or “comprise” a component, they are meant to further include other components, not excluding thereof unless there is a particular description contrary thereto.

FIG. 1 is a perspective view illustrating a razor cartridge 10 according to an embodiment of the present disclosure.

Figure 2:
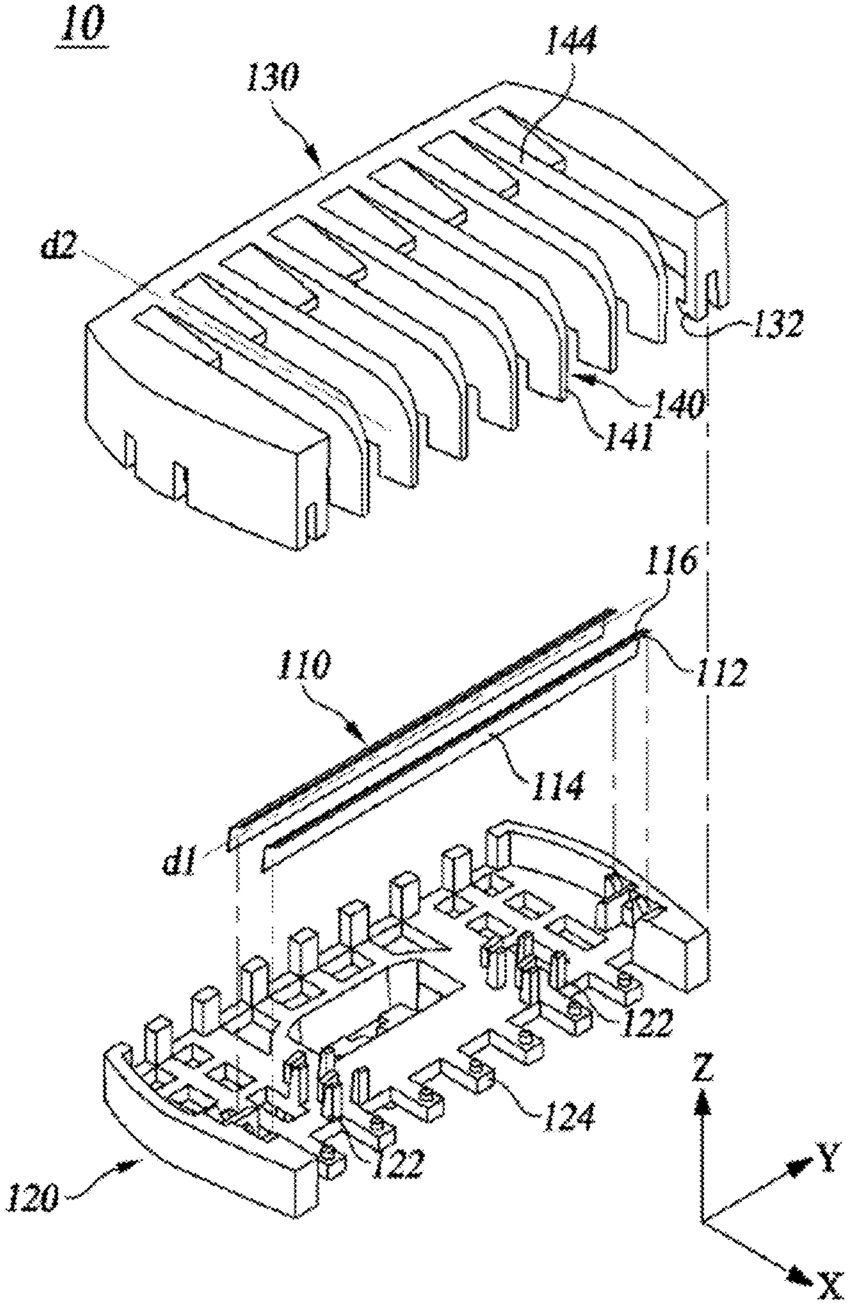
FIG. 2 is an exploded perspective view illustrating the razor cartridge according to an embodiment of the present disclosure.

FIG. 2 is an exploded perspective view illustrating the razor cartridge 10 according to an embodiment of the present disclosure.

Referring to FIGS. 1 and 2, the razor cartridge 10 may include a blade housing 12 and at least one shaving blade 110.

The blade housing 12 may form the appearance of the razor cartridge 10, and may accommodate at least one shaving blade 110 therein.

The blade housing 12 may include a receiving base 120, a cap 130, and a plurality of comb elements 140.

At least one shaving blade 110 may have a cutting edge 112 for cutting the hair.

At least one shaving blade 110 may be accommodated in the blade housing 12 while being arranged in a first direction d1. In this case, the first direction d1 may be perpendicular to a shaving direction SD. Here, the shaving direction SD refers to a direction in which the razor cartridge 10 moves, during the shaving. For example, the shaving direction SD may be parallel to the direction of an X-axis of FIG. 1.

at least one shaving blade 110 may include a bending blade or a welded blade. The bending blade and the welded blade each include a bent area, whereas a straight blade does not include a bent area.

Therefore, the razor cartridge 10 according to an embodiment of the present disclosure does not need a spacer for spacing the cutting edge from a base member. Thereby, the razor cartridge 10 may have a simpler configuration.

The receiving base 120 may receive at least one shaving blade 110 arranged in the first direction d1.

The receiving base 120 may include a plurality of receiving protrusions 122 for receiving or at least partially accommodating at least one shaving blade 110. The plurality of receiving protrusions 122 may be arranged in the first direction d1 on a surface of the receiving base 120 that is adjacent to at least one shaving blade 110.

The plurality of receiving protrusions 122 may support a base portion 114 of at least one shaving blade 110.

To be more specific, the base portion 114 may be disposed between the receiving protrusion 122 disposed in front of the base portion 114 and the receiving protrusion 122 disposed in back of the base portion 114, and may be supported by each receiving protrusion 122.

In this way, at least one shaving blade 110 may be disposed in a space where the receiving protrusions 122 are formed, and then may be assembled on the receiving base 120.

On the other hand, the extension direction of the plurality of receiving protrusions 122 may be substantially perpendicular to a surface of the receiving base 120. However, the present disclosure is not limited thereto.

For example, the plurality of receiving protrusions 122 may extend in a direction that is not perpendicular to a surface of the receiving base 120, according to a direction in which the base portion 114 is received on the receiving base 120.

The razor cartridge 10 according to an embodiment of the present disclosure does not require a separate spacer for spacing neighboring shaving blades from each other, because the plurality of receiving protrusions 122 is disposed on the receiving base 120. Therefore, the razor cartridge 10 according to an embodiment of the present disclosure may reduce the number of components in manufacturing by injecting the receiving base 120 and the receiving protrusion 122 together, thus having a manufacturing advantage.

The cap 130 may cover at least a portion of the receiving base 120 in a state where the receiving base 120 receives at least one shaving blade 110.

For example, a coupling hook 132 formed on a side of the cap 130 may be configured to be coupled to a side of the receiving base 120 through hook coupling. However, the present disclosure is not limited thereto, but the cap 130 and the receiving base 120 may be configured to be coupled to each other through other coupling methods.

The cap 130 may support both ends of at least one shaving blade 110. Thereby, at least one shaving blade 110 may be firmly maintained in the blade housing 12.

The plurality of comb elements 140 may extend toward the front of the receiving base 120, and at least some of the plurality of comb elements 140 may be disposed in front of at least one shaving blade 110.

The plurality of comb elements 140 may arrange a user's hair using a space between the comb elements 140 during shaving. To be more specific, the plurality of comb elements 140 may include head portions (or forward portions of second surfaces) 141 formed on free ends of the plurality of comb elements 140.

The head portion 141 serves to arrange the user's hair entering from the front of the cutting edge 112 to the cutting edge 112. Thereby, the hair may contact the cutting edge 112 in the arranged state, thus making it easier to cut the hair.

The head portion 141 may have a shape that becomes narrower in width toward the free end of the head portion 141. For example, the width of the fixed end of the head portion 141 may have a value ranging from about 1.4 mm to 1.8 mm, while the width of the free end of the head portion

141 may have a value ranging from about 0.57 mm to 0.77 mm. However, the present disclosure is not limited thereto.

Since the head portion 141 has the shape that becomes narrower in width toward the free end, a distance between neighboring head portions 141 may be increased toward the free end of the head portion 141. For example, a distance between the fixed ends of the neighboring head portions 141 may have a value ranging from about 2.7 mm to 3.1 mm, while a distance between the free ends of the neighboring head portions 141 may have a value ranging from about 3.5 mm to 4.1 mm. However, the present disclosure is not limited thereto.

On the other hand, the plurality of comb elements 140 may extend toward the front of the receiving base 120 in the second direction d2 that is not perpendicular to the first direction d1. In this case, the second direction d2 may be substantially parallel to the shaving direction SD.

Turning back to FIGS. 1 and 2, each of the comb elements 140 may include a bottom surface (or a first surface) 142 and a top surface (or a skin facing portion of a second surface) 144.

The bottom surface 142 is a surface of the comb element 140 adjacent to the receiving base 120, and at least a portion of the bottom surface 142 may be adjacent to the cutting edge 112. The top surface 144 may face the bottom surface 142, and may be spaced apart from the cutting edge 112.

The top surface 144 may define a shaving plane SP (see FIG. 6) by contacting a user's skin. Thus, the hair may be cut by the cutting edge 112 at a position spaced apart from the shaving plane. That is, the stubble shaving may be made.

The plurality of comb elements 140 may be formed integrally with the cap 130. In this case, the plurality of comb elements 140 may extend from a side of the cap 130, and may have a continuous shape as a whole. However, the present disclosure is not limited thereto.

For example, the plurality of comb elements 140 may be formed on the receiving base 120 or in both the receiving base 120 and the cap 130. This will be described in detail with reference to FIGS. 14 and 15.

The receiving base 120 may further include a plurality of teeth 124.

The plurality of teeth 124 may be disposed to correspond in position to the plurality of comb elements 140, and may extend in the second direction d2.

The free ends of the plurality of teeth 124 may contact the head portions 141 of the plurality of comb elements 140.

Figure 6:
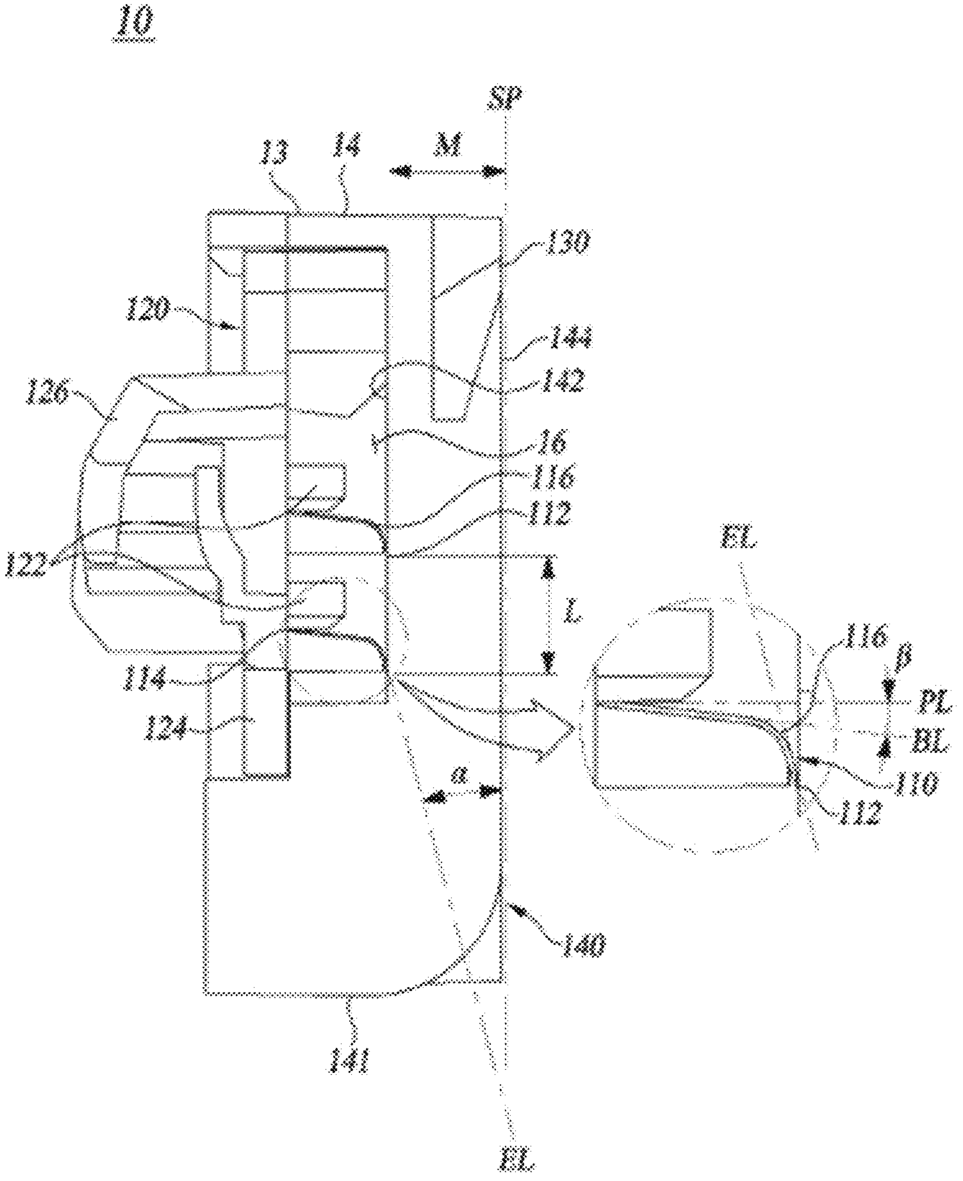
FIG. 6 is a sectional view taken along a direction VI-VI' of FIG. 3 to show the razor cartridge according to an embodiment of the present disclosure.

In this case, at least a portion of the bottom surface 142 adjacent to the cutting edge 112 and an area of the receiving base 120 facing at least a portion of the bottom surface 142 may define a plurality of receiving holes 16 (see FIG. 6).

At least one shaving blade 110 may pass through the plurality of receiving holes 16. The plurality of receiving holes 16 may provide a sufficient space for the plurality of shaving blades 110 to be accommodated.

On the other hand, in order to form the receiving hole 16, at least a portion of the bottom surface 142 may at least partially surround the peripheral area of the shaving blade 110. To this end, the bottom surface 142 may have a stepped shape.

Figure 3:
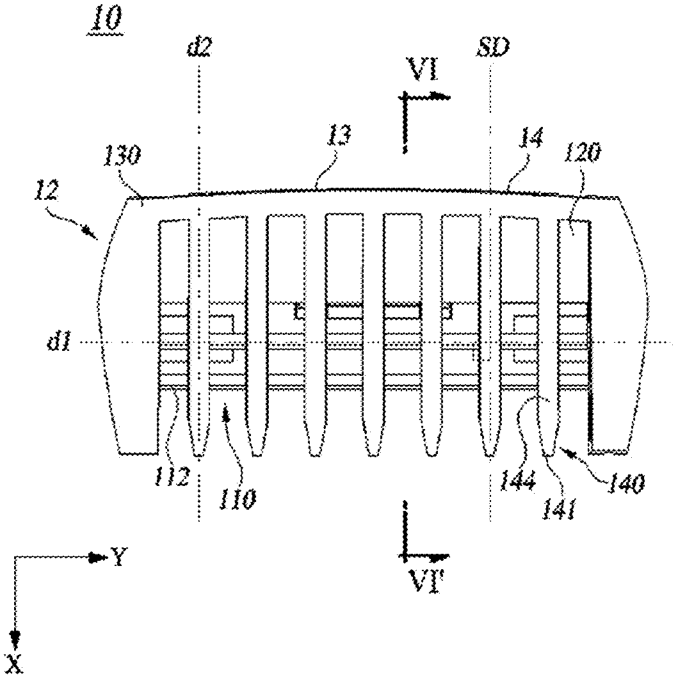
FIG. 3 is a front view illustrating the razor cartridge according to an embodiment of the present disclosure.

FIG. 3 is a front view illustrating the razor cartridge 10 according to an embodiment of the present disclosure.

Referring to FIG. 3, at least one shaving blade 110 may include the plurality of shaving blades 110 that are arranged side by side. Thus, the shaving blade cartridge 10 may provide multi-blade stubble shaving.

The plurality of comb elements 140 may be integrally formed.

To be more specific, each comb element 140 may be integrally formed from a side of the cap 130 from which each comb element 140 extends to the free end of the comb element 140. In this case, the top surfaces 144 of the comb elements 140 may have a continuous shape as a whole.

To be more specific, the top surface 144 of each comb element 140 extends toward the front of the receiving base 120 while completely traversing over each cutting edge 112. Therefore, when seeing the razor cartridge 10 with the top surface 144 facing toward the front, the plurality of comb elements 140 may at least partially cover a space between the plurality of shaving blades 110.

Therefore, it is possible to prevent a user's skin from being excessively pressed by a space between the plurality of shaving blades 110, thus restricting a direct contact between the cutting edge 112 of the shaving blade 110 and the user's skin. Thereby, the safety risk of cutting the pressed skin by the shaving blade 110 can be minimized.

On the other hand, in the front of the foremost shaving blade 110 among at least one shaving blade 110, the space between the plurality of comb elements 140 may not overlap the receiving base 120.

Therefore, the space between the comb elements 140 may be opened in front of the foremost shaving blade 110. Here, the foremost shaving blade 110 refers to a shaving blade disposed on the foremost position among at least one shaving blade 110.

Thereby, the user's hair may contact the foremost shaving blade 110 in an erected state without being interfered by the comb element 140 and the receiving base 120, thus allowing the hair to be effectively cut. This will be described in detail with reference to FIGS. 7A and 7B.

Figure 4:
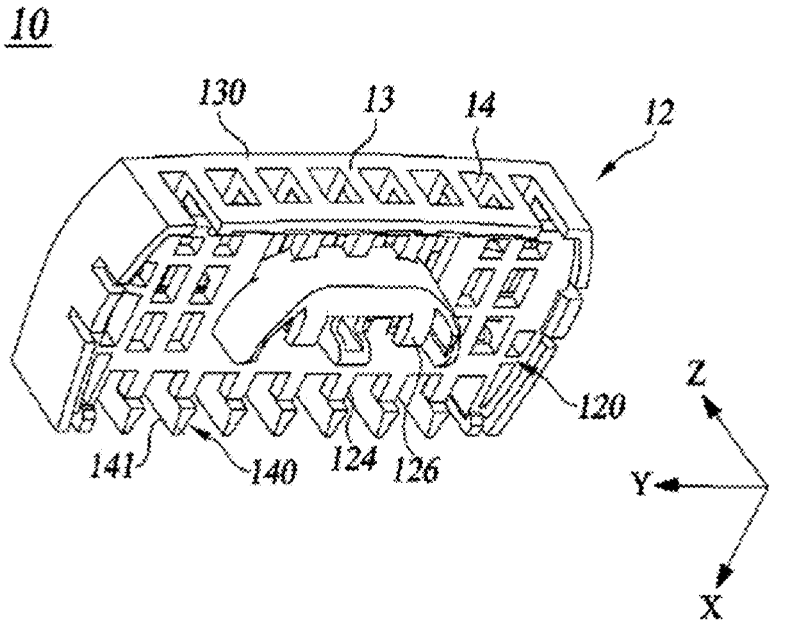
FIG. 4 is a rear perspective view illustrating the razor cartridge according to an embodiment of the present disclosure.

FIG. 4 is a rear perspective view illustrating the razor cartridge 10 according to an embodiment of the present disclosure.

Referring to FIG. 4, the blade housing 12 may include a rear side (or third surfaces) 13, a washing hole 14, and a handle connecting unit 126. The first surfaces 142 may be coupled to both of the forward portions of second surfaces 141 and the third surfaces 13 as shown in FIG. 2 and FIG. 5.

The rear side 13 may be a side of the blade housing 12 that is positioned in back of at least one shaving blade 110.

At least one washing hole 14 may be formed in the rear side (or the third surfaces) 13, and may pass through the rear side 13. Further, at least one washing hole 14 may be disposed to correspond to a space between the comb elements 140.

The debris of the hair that is cut by the shaving blade 110 may be washed away from the razor cartridge 10 through the washing hole 14 formed in the rear side 13.

The handle connecting unit 126 may be disposed on the other side of the receiving base 120.

The handle connecting unit 126 may be configured to be coupled to a razor handle (not shown). To be more specific, the handle connecting unit 126 may be pivotably coupled to the razor handle, but the present disclosure is not limited thereto.

Figure 5A:
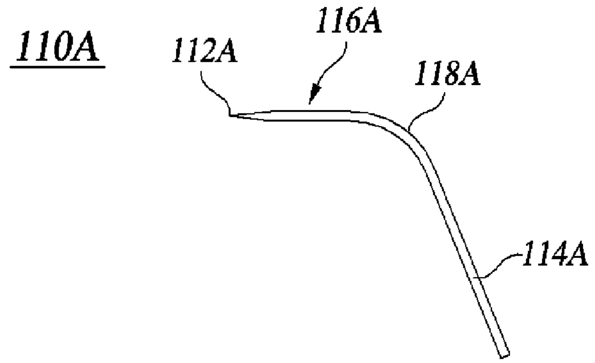
FIGS. 5A and 5B are side views illustrating a shaving blade according to an embodiment of the present disclosure.
Figure 5B:
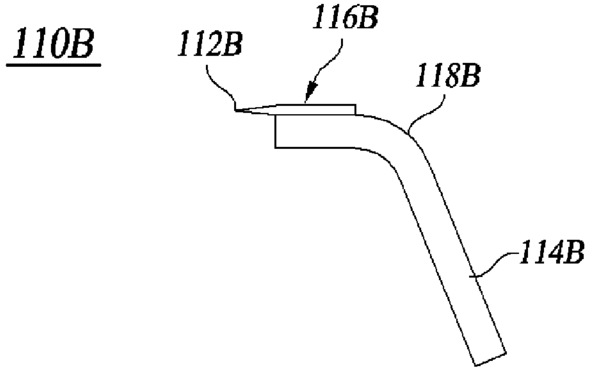

FIGS. 5A and 5B are side views illustrating the shaving blade 110 according to an embodiment of the present disclosure.

To be more specific, FIG. 5A shows the bending blade, and FIG. 5B shows the welded blade.

Referring to FIGS. 5A and 5B, the shaving blade 110 according to an embodiment of the present disclosure may include the bending blade or the welded blade having the bent area.

To be more specific, at least one shaving blade 110 may include a base portion 114 accommodated in the receiving base 120, and an edge portion 116 including the cutting edge 112.

The base portion 114 may be an area on the shaving blade 110 that is supported by the receiving protrusion 122 of the receiving base 120.

The edge portion 116 may extend from an end of the base portion 114, and may have the cutting edge 112 on an end of the edge portion 116.

Referring to FIG. 5A, in the bending blade 110A, the base portion 114A and the edge portion 116A (including the cutting edge 112A) may be integrally formed. In contrast, referring to FIG. 5B, in the welded blade 110B, the edge portion 116B (including the cutting edge 112B) may be fixed to a surface of the base portion 114B by welding.

The base portions 114A and 114B of the bending blade 110A and the welded blade 110B may include the bent areas 118A and 118B, respectively.

Since the razor cartridge 10 according to an embodiment of the present disclosure has the shaving blade of the bending blade or the welded blade, the spacer for spacing the cutting edge from the base member is not required.

Since no spacer is included, the razor cartridge 10 may have a simpler structure, and the entire size of the razor cartridge 10 may also be reduced.

FIG. 6 is a sectional view taken along a direction VI-VI' of FIG. 3 to show the razor cartridge 10 according to an embodiment of the present disclosure.

Referring to FIG. 6, the cutting edge 112 of the shaving blade 110 may be received on the receiving base 120 to have a predetermined angle with the shaving plane SP.

To be more specific, referring to FIG. 6, an angle $\alpha$ between the extension direction EL of the cutting edge 112 and the shaving plane SP may range from 10 degrees to 25 degrees, and preferably from 13 degrees to 19 degrees. The shaving blade 110 may have an optimum cutting force within such an angular range of the cutting edge 112.

The base portion 114 may be supported by the plurality of receiving protrusions 122. In this case, on a section taken along the direction perpendicular to the first direction d1, the extension direction BL of the base portion 114 may not be parallel to a normal line PL of the shaving plane SP. Further, the extension direction BL of the base portion 114 may not be perpendicular to the second direction d2 in which the plurality of comb elements 140 extend.

In other words, the shaving blade 110 may be received on the receiving base 120 while the base portion 114 is slightly inclined with respect to the shaving plane SP. In this case, an angle $\beta$ between the normal line PL of the shaving plane SP and the extension direction BL of the base portion 114 may range from 5 degrees to 10 degrees, and preferably 7 degrees to 8 degrees. However, the present disclosure is not limited thereto.

In the stubble shaving, the relatively long hair may be cut in a slightly laid-down position. Therefore, in the stubble shaving, an ideal angle between the extension direction EL of the cutting edge 112 and the shaving plane may be different from that of the general shaving.

On the other hand, if the shaving blade different from the shaving blade (not shown) used in the general razor is separately manufactured and used to achieve the angle of the cutting edge 112 suitable for the stubble shaving, additional cost may be incurred in the manufacture of the shaving blade.

Therefore, the shaving blade 110 used in the stubble razor may use the same shaving blade as the general razor so as to prevent the additional cost from incurring.

The base portion 114 is received while being inclined with respect to the normal line PL of the shaving plane SP. Thus, even if the shaving blade of the general razor is used, the razor cartridge 10 according to an embodiment of the present disclosure can achieve the angle of the cutting edge 112 suitable for the stubble shaving. In this case, the angle between the base portion 114 and the edge portion 116 may range from 100 degrees to 120 degrees, and preferably 105 degrees to 115 degrees, as in the shaving blade used in the general razor.

However, the razor cartridge 10 according to an embodiment of the present disclosure may use the shaving blade that is further bent compared to the shaving blade used in the general razor, so as to simplify the receiving structure of the shaving blade 110. In this case, the angle between the base portion 114 and the edge portion 116 may range from 90 degrees to 110 degrees, and preferably 95 degrees to 105 degrees.

The cutting edge 112 of each of the shaving blades 110 may have the same protrusion value with respect to the shaving plane SP.

The protrusion value of each cutting edge 112 is defined as a distance between each cutting edge 112 and the top surface 144. However, in the case of having the plurality of shaving blades 110, the protrusion value of the cutting edge 112 may be defined as a distance between the top surface 144 and a cutting edge plane-CP that is an imaginary plane formed by the cutting edges 112 of the plurality of shaving blades 110.

The cutting edge 112 of each of the shaving blades 110 may have a negative protrusion value with respect to the shaving plane SP. At this time, the protrusion value of the cutting edge 112 may be differently set depending on the length of the hair that is to be left through the stubble shaving.

In this connection, various kinds of caps 130 having different distances between the cutting edge 112 and the top surface 144 may be provided. For instance, a 3 mm-cap 130 in which the distance between the cutting edge 112 and the top surface 144 is 3 mm, and a 5 mm-cap 130 in which the distance between the cutting edge 112 and the top surface 144 is 5 mm may be provided.

The cap 130 may be detachably attached to the receiving base 120 to be replaced with another one. In this case, a user may detach an existing cap 130 from the receiving base 120, and then attach the cap 130 corresponding to a desired hair length to the receiving base 120.

On the other hand, in order to make proper stubble shaving, it is necessary to space a user's skin and the cutting edge 112 by a predetermined distance during shaving. Therefore, the distance between the top surface 144 and the cutting edge plane CP may be 1.0 mm or more. In this case, the cutting edge 112 may have a negative protrusion value of −1.0 mm or less.

In the multi-blade razor, it is necessary to space one cutting edge and another cutting edge by a predetermined distance. Therefore, in the plurality of shaving blades 110, the distance L between one cutting edge 112 and another cutting edge 112 may be 1.0 mm or more.

On the other hand, the distance L between one cutting edge 112 and another cutting edge 112 may be designed to vary depending on a distance M between the top surface 144 and the cutting edge plane CP.

For example, in the plurality of shaving blades 110, the distance L between one cutting edge 112 and another cutting edge 112 may be greater than the distance M between the top surface 144 and the cutting edge plane CP.

As compared to the general shaving, the hair cut by the cutting edge in the stubble shaving has a relatively longer length. On the other hand, in some cases, the hair may be directed to a subsequent cutting edge in a laid-down position without being cut by the cutting edge. In this connection, it may take a relatively longer time for the hair to be laid down by the cutting edge and then be erected again.

If the distance L between one cutting edge 112 and another cutting edge 112 has a relatively smaller value than the distance M between the top surface 144 and the cutting edge plane CP, the hair that is laid down without being cut by the cutting edge 112 located at a front position may reach the cutting edge 112 located at a rear position before the hair being sufficiently erected. In this case, since the hair is cut in a laid-down position, it is difficult to properly cut the hair by the cutting edge 112 located at the rear position.

Since the razor cartridge 10 according to an embodiment of the present disclosure is configured such that the distance L between one cutting edge 112 and a neighboring cutting edge 112 is greater than the distance M between the top surface 144 and the cutting edge plane CP, it is possible to provide a sufficient time until the hair that is laid down without being cut by the cutting edge 112 located at the front position reaches the cutting edge 112 located at the rear position. Thus, the effective stubble shaving using the multi-blade is possible.

Figure 7A:
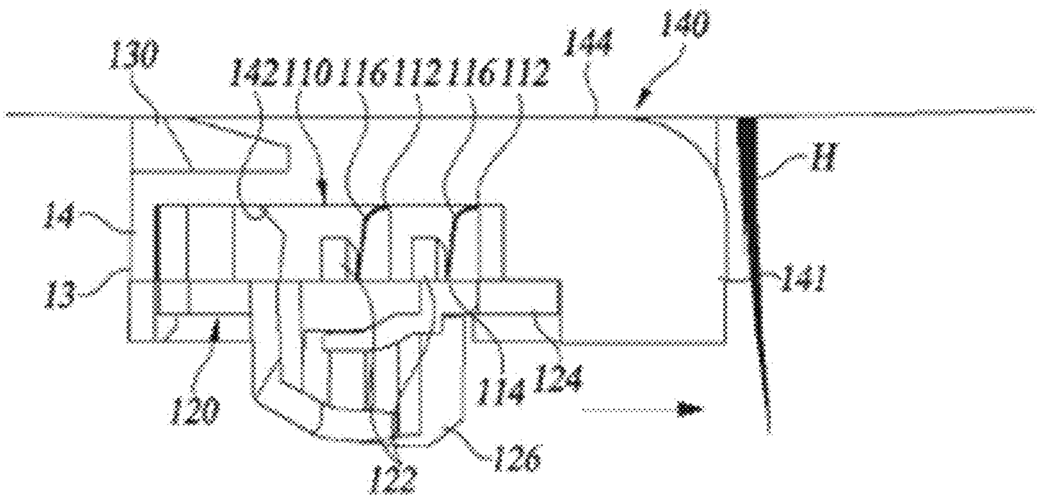
FIGS. 7A and 7B are exemplary diagrams showing that hair is cut by the shaving blade according to an embodiment of the present disclosure.
Figure 7B:
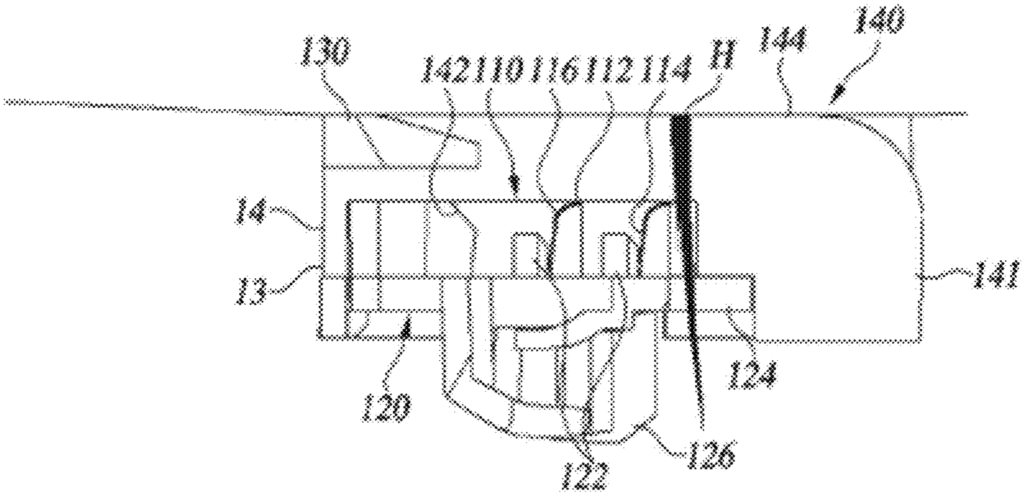

FIGS. 7A and 7B are exemplary diagrams showing that hair is cut by the shaving blade 110 according to an embodiment of the present disclosure.

To be more specific, FIG. 7A shows a state before the hair H is introduced into the razor cartridge 10, and FIG. 7B shows a state where the hair H is introduced into the razor cartridge 10 and enters the shaving blade 110.

For the convenience of description, FIG. 7A and FIG. 7B show the razor cartridge 10 and the hair H through the same section as FIG. 6.

Referring to FIG. 7A, the hair H may be arranged by the plurality of comb elements 140 while being introduced into the razor cartridge 10.

To be more specific, the hair H may be introduced into the space between the plurality of comb elements 140, and may be arranged in the second direction d2 that is the extension direction of the plurality of comb elements 140.

Since the hair H does not contact the razor cartridge 10 before being introduced into the razor cartridge 10, the hair may maintain an erected state.

Referring to FIG. 7B, the hair H arranged by the plurality of comb elements 140 may enter the shaving blade 110 while maintaining the erected state.

As shown in FIG. 3, in front of the foremost shaving blade 110 among at least one shaving blade 110, the space between the plurality of comb elements 140 may not overlap the receiving base 120.

Therefore, the space between the comb elements 140 may be opened in front of the foremost shaving blade 110, and the hair H may contact the foremost shaving blade 110 in the erected state.

When the hair H contacts the shaving blade 110 in the erected state rather than the laid-down state, the hair may be more easily cut. Therefore, the razor cartridge 10 according to an embodiment of the present disclosure may provide more effective stubble shaving.

Another embodiment of the present disclosure shown in FIGS. 8 to 13, which will be described later, is different from an embodiment of the present disclosure shown in FIGS. 1 to 7 in that at least one shaving blade is disposed not to be perpendicular to the shaving direction. Hereinafter, unique characteristics according to another embodiment of the present disclosure will be mainly described, and a duplicated description of components which are substantially equal to those of an embodiment of the present disclosure will be omitted.

Figure 8:
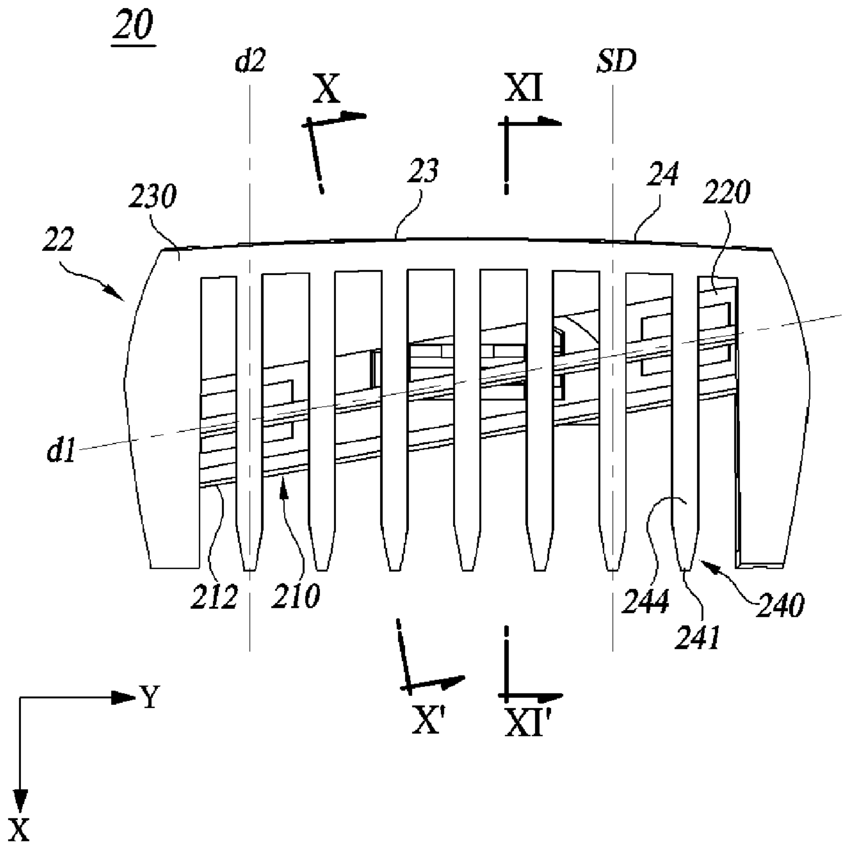
FIG. 8 is a front view illustrating a razor cartridge according to another embodiment of the present disclosure.

FIG. 8 is a front view illustrating a razor cartridge 20 according to another embodiment of the present disclosure.

Figure 9:
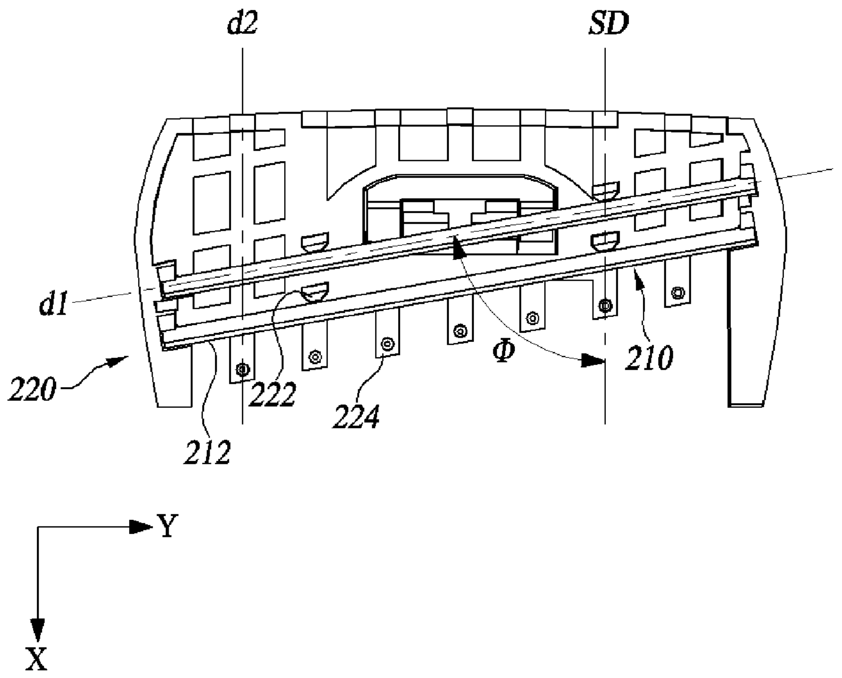
FIG. 9 illustrates a state in which a cap and a plurality of comb elements are removed from the razor cartridge of FIG. 8.

FIG. 9 illustrates a state in which a cap 230 and a plurality of comb elements 240 are removed from the razor cartridge 20 of FIG. 8.

Referring to FIGS. 8 and 9, the first direction d1 that is the arrangement direction of the shaving blade 210 may not be perpendicular to the shaving direction SD.

To be more specific, an angle Φ between the first direction d1 and the shaving direction SD may range from 70 degrees to 89 degrees.

Through the diagonal arrangement of the shaving blade 210, a contact area between the hair and the cutting edge 212 may be reduced, and thus, the cutting force of the cutting edge 212 may concentrate on a specific area of the hair.

In this case, the hair may be locally cut in that specific area. This local cutting of the hair may help the easy cutting of other areas of the hair that subsequently contact the cutting edge 212. That is, the diagonal arrangement of the shaving blade 210 accelerates the cutting of the hair, so that effective shaving is achieved. This will be described in detail with reference to FIGS. 12A, 12B, 13A and 13B.

On the other hand, at least one shaving blade 210 may include the plurality of shaving blades 210 that are arranged side by side. Thus, the shaving blade cartridge 20 may provide multi-blade stubble shaving.

The plurality of comb elements 240 may be integrally formed.

To be more specific, each comb element 240 may be integrally formed from a side of the cap 230 from which each comb element 240 extends to the free end of the comb element 240. In this case, the top surfaces 244 of the comb elements 240 may have a continuous shape as a whole.

The plurality of comb elements 240 may at least partially cover a space between the plurality of shaving blades 210.

Therefore, it is possible to prevent a user's skin from being excessively pressed by a space between the plurality of shaving blades 210. Thereby, the safety risk of cutting the pressed skin by the shaving blade 210 can be minimized.

On the other hand, in the front of the foremost shaving blade 210 among at least one shaving blade 210, the space between the plurality of comb elements 240 may not overlap the receiving base 220.

Therefore, the space between the comb elements 240 may be opened in front of the foremost shaving blade 110. Here, the foremost shaving blade 210 refers to a shaving blade disposed on the foremost position among at least one shaving blade 210.

Thereby, the user's hair may contact the foremost shaving blade 210 in the erected state, thus allowing the hair to be effectively cut.

Figure 10:
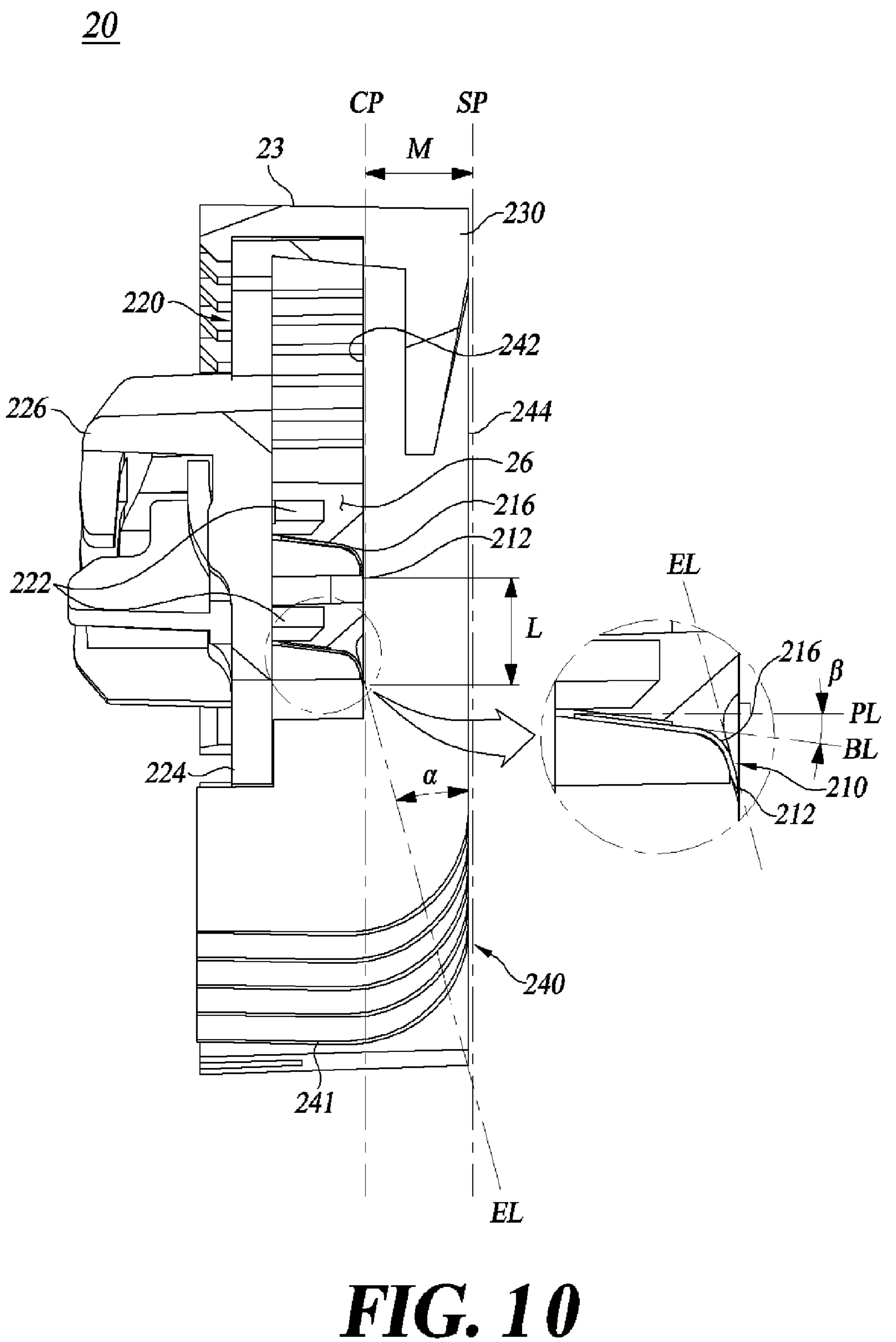
FIG. 10 is a sectional view taken along a direction X-X' of FIG. 8 to show the razor cartridge according to another embodiment of the present disclosure.

FIG. 10 is a sectional view taken along a direction X-X' of FIG. 8 to show the razor cartridge 20 according to another embodiment of the present disclosure.

Figure 11:
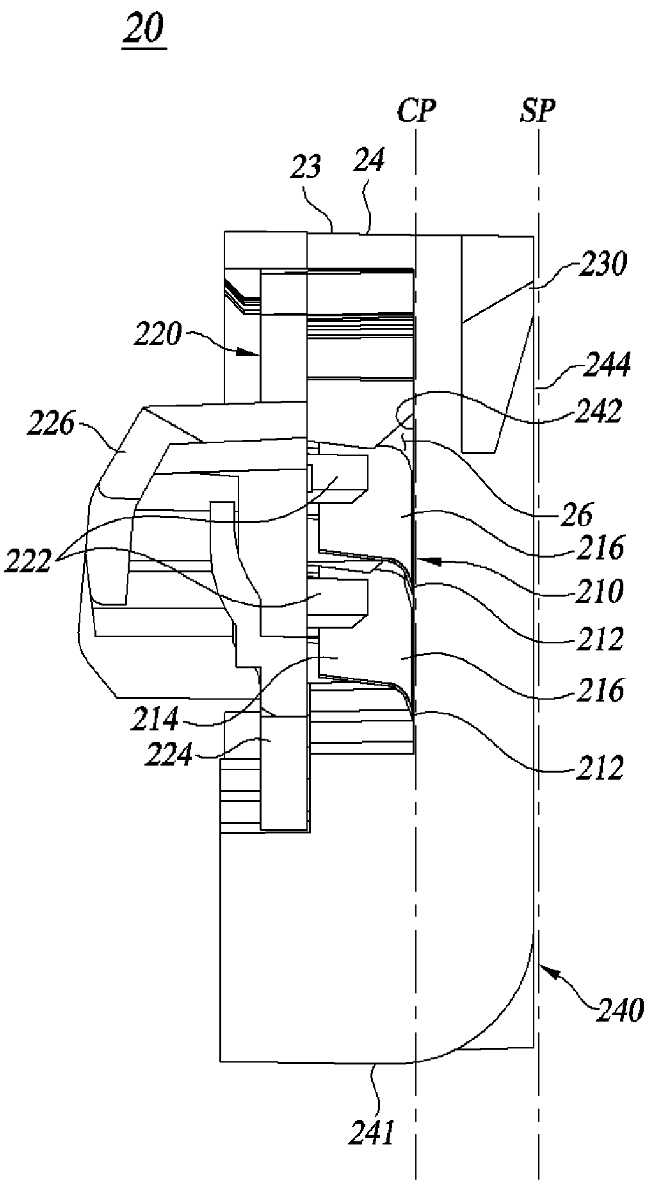
FIG. 11 is a sectional view taken along a direction XI-XI' of FIG. 8 to show the razor cartridge according to another embodiment of the present disclosure.

FIG. 11 is a sectional view taken along a direction XI-XI' of FIG. 8 to show the razor cartridge 20 according to another embodiment of the present disclosure.

Referring to FIGS. 10 and 11, the cutting edge 212 of the shaving blade 210 may be received on the receiving base 220 to have a predetermined angle with the shaving plane SP.

To be more specific, referring to FIG. 10, an angle α between the extension direction EL of the cutting edge 212 and the shaving plane SP may range from 10 degrees to 25 degrees.

The base portion 214 may be supported by the plurality of receiving protrusions 222. In this case, on a section taken along the direction perpendicular to the first direction d1, the extension direction BL of the base portion 214 may not be parallel to a normal line PL of the shaving plane SP. Further, the extension direction BL of the base portion 214 may not be perpendicular to the second direction d2 in which the plurality of comb elements 240 extend.

In other words, the shaving blade 210 may be received on the receiving base 220 while the base portion 214 is slightly inclined with respect to the shaving plane SP. In this case, an angle β between the normal line PL of the shaving plane SP and the extension direction BL of the base portion 214 may range from 7 degrees to 8 degrees. However, the present disclosure is not limited thereto.

The cutting edge 212 of each of the shaving blades 210 may have the same protrusion value with respect to the shaving plane SP.

The cutting edge 212 of each of the shaving blades 210 may have a negative protrusion value with respect to the shaving plane SP. At this time, the protrusion value of the cutting edge 212 may be differently set depending on the length of the hair that is to be left through the stubble shaving.

The distance between the top surface 244 and the cutting edge plane CP may be 1.0 mm or more. In this case, the cutting edge 212 may have a negative protrusion value of −1.0 mm or less.

In the multi-blade razor, it is necessary to space one cutting edge and another cutting edge by a predetermined distance. Therefore, in the plurality of shaving blades 210, the distance L between one cutting edge 212 and a neighboring cutting edge 212 may be 1.0 mm or more.

On the other hand, the distance L between one cutting edge 212 and the neighboring cutting edge 212 may be designed to vary depending on a distance M between the top surface 244 and the cutting edge plane CP.

For example, in the plurality of shaving blades 210, the distance L between one cutting edge 212 and the neighboring cutting edge 212 may be greater than the distance M between the top surface 244 and the cutting edge plane CP.

Figure 12A:
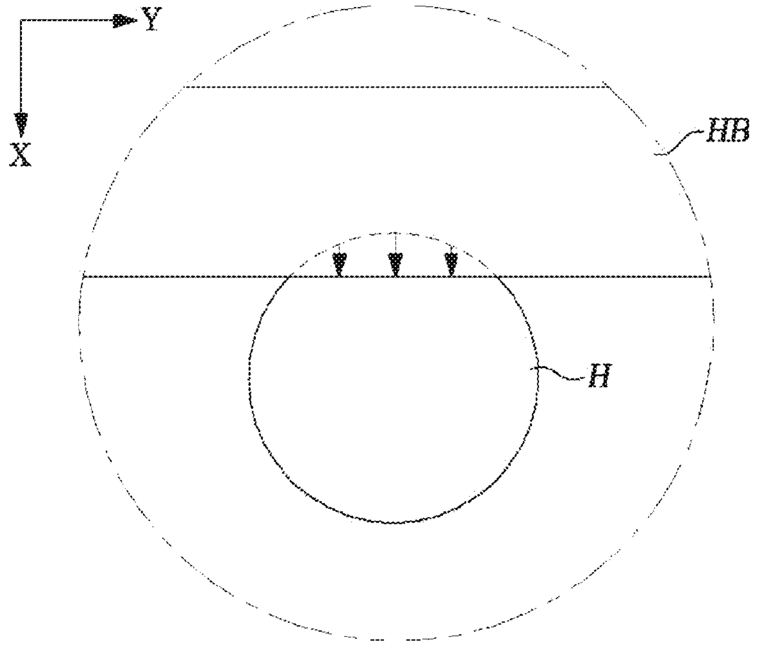
FIG. 12A (Prior Art)
FIGS. 12A and 12B are exemplary diagrams showing that hair is cut by a horizontal shaving blade that is disposed to be perpendicular to the shaving direction.
Figure 12B:
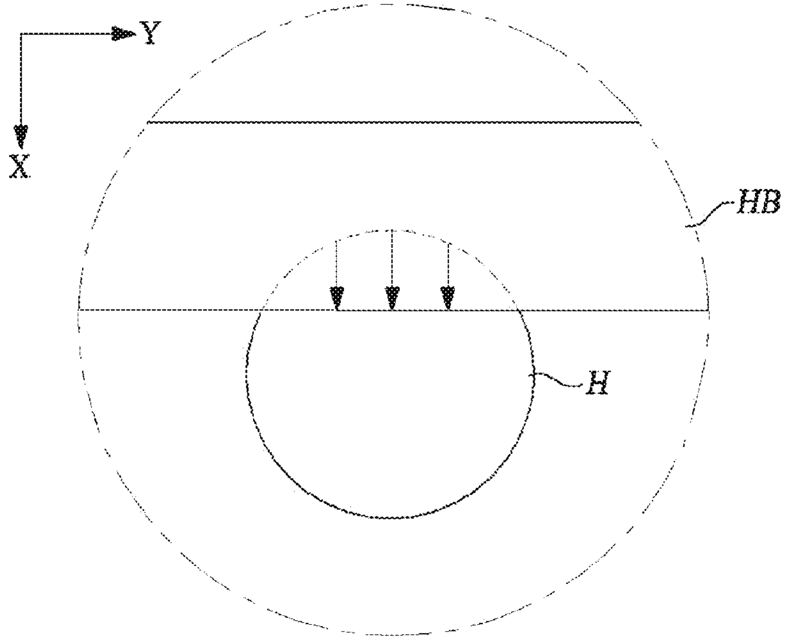
FIG. 12B (Prior Art)

FIGS. 12A and 12B are exemplary diagrams showing that hair is cut by a horizontal shaving blade that is disposed to be perpendicular to the shaving direction.

Figure 13A:
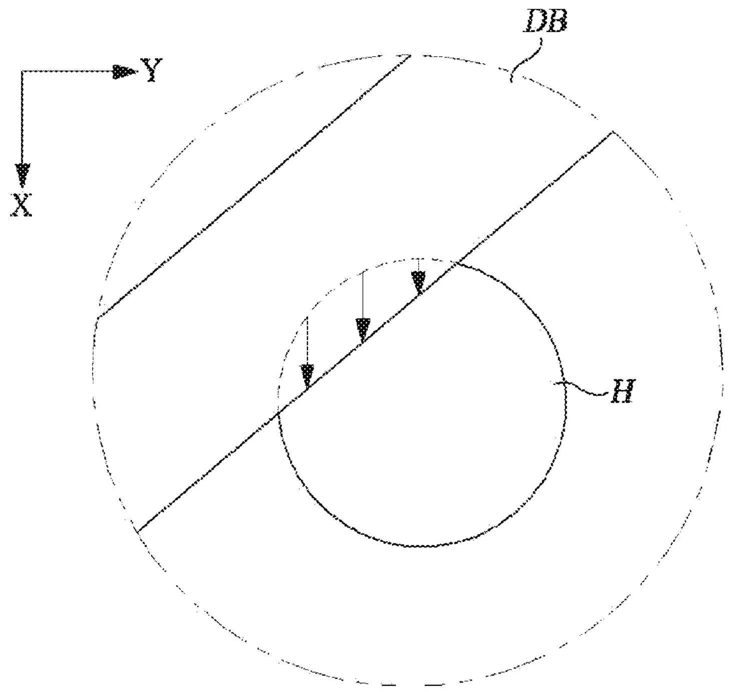
FIG. 13A (Prior Art)
FIGS. 13A and 13B are exemplary diagrams showing that hair is cut by a diagonal shaving blade that is disposed not to be perpendicular to the shaving direction.
Figure 13B:
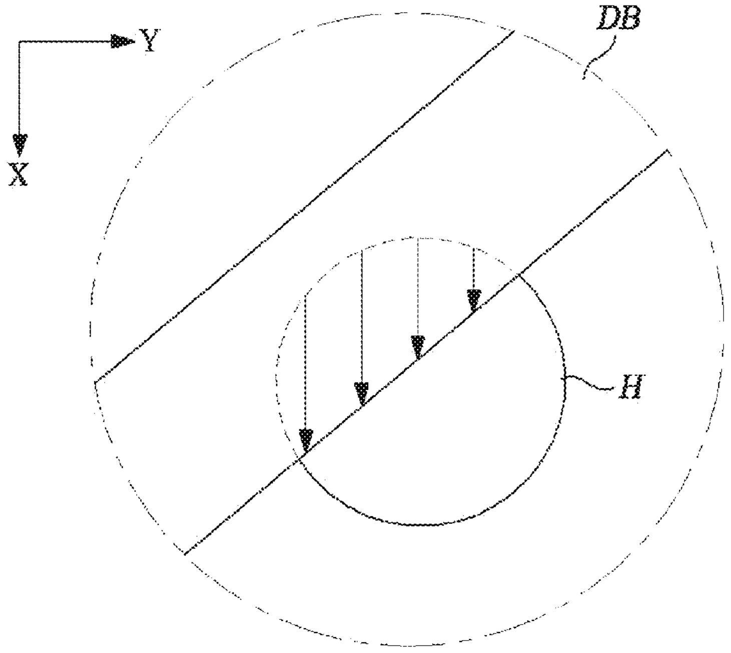
FIG. 13B (Prior Art)

FIGS. 13A and 13B are exemplary diagrams showing that hair is cut by a diagonal shaving blade that is disposed not to be perpendicular to the shaving direction.

To be more specific, FIG. 12A and FIG. 13A show states where the hair H starts to be cut by the horizontal shaving blade HB and the diagonal shaving blade DB, respectively, while FIG. 12B and FIG. 13B show states where half of the hair H is cut by the horizontal shaving blade HB and the diagonal shaving blade DB, respectively.

In FIGS. 12A, 12B, 13A and 13B, it is assumed that the horizontal shaving blade HB moves in a positive X-axis direction.

Further, in the description of FIGS. 12A, 12B, 13A and 13B, the upper area, the lower area, the left area, and the right area of the hair H are defined with reference to FIGS. 12A, 12B, 13A and 13B. For example, the upper area of the hair H refers to an area located in a negative X-axis direction on the hair H.

Since the razor cartridge 20 according to another embodiment of the present disclosure is used for the stubble shaving, it cuts a relatively long hair. Such a long hair has a weak erection force, so that the hair is easily laid down by the shaving blade.

Therefore, during the stubble shaving, there may occur a phenomenon in which the only a front portion of the hair is cut and a remaining rear portion is laid down by the shaving blade without being cut. In this case, the shaving blade may be operated with the hair embedded therein, and the hair may be pulled out without being cut. This may reduce cutting efficiency, and may give an unpleasant feeling to a user.

In this regard, the diagonal arrangement of the shaving blade 210 can minimize a problem where hair is pulled out. Hereinafter, a principle where the cutting force is reduced according to the diagonal arrangement of the shaving blade 210 will be described in detail.

Referring to FIGS. 12A and 12B, in a state where the hair H starts to be cut by the horizontal shaving blade HB, the upper area of the hair H may evenly contact the horizontal shaving blade HB.

Therefore, the cutting force by the horizontal shaving blade HB may be evenly transmitted to the upper area of the hair H, and the hair H may be cut by the cutting force of the horizontal shaving blade HB while the cutting force being dispersed in the upper area of the hair H. That is, the cutting degree in each area of the hair H may be small.

On the other hand, the cutting of the hair H may be accelerated as more cuts are made in the area of the hair H where the cutting is made. That is, as more cuts are made in the area of the hair H that is to be cut, the magnitude of the cutting force required to cut the hair H to the same degree may be reduced.

In this regard, when the hair H is cut from the state of FIG. 12A to the state of FIG. 12B using the horizontal shaving blade HB, a relatively large cutting force may be required.

In contrast, referring to FIG. 13A and FIG. 13B, in a state where the hair H starts to be cut by the diagonal shaving blade DB, the left area in the upper area of the hair H may preferentially contact the diagonal shaving blade DB.

Therefore, the cutting force by the diagonal shaving blade DB may be intensively transmitted to the left area of the upper area of the hair H, and the cutting of the hair H by the cutting force of the diagonal shaving blade DB may be intensively made in the left area of the upper area of the hair H.

As described above, the cutting of the hair H may be accelerated as more cuts are made in the area of the hair H where the cutting is made. In this regard, when the hair H is cut from the state of FIG. 13A to the state of FIG. 13B using the diagonal shaving blade DB, a relatively small cutting force may be required.

To be more specific, the cutting force of the diagonal shaving blade DB may concentrate on the left area in the upper area of the hair H, so a relatively large cut may be made. A cut in the left area of the hair H may aid in cutting the right area of the hair H that subsequently contacts the diagonal shaving blade DB.

Therefore, the razor cartridge 20 according to another embodiment of the present disclosure may provide more effective stubble shaving by diagonally arranging the shaving blade 210.

The other embodiment of the present disclosure shown in FIGS. 14 and 15, which will be described later, is different from the embodiment of the present disclosure shown in FIGS. 1 to 7 in that the plurality of comb elements are separately formed in the receiving base and the cap. Hereinafter, unique characteristics according to the other embodiment of the present disclosure will be mainly described, and a duplicated description of components which are substantially equal to those of the embodiment of the present disclosure will be omitted.

Figure 14:
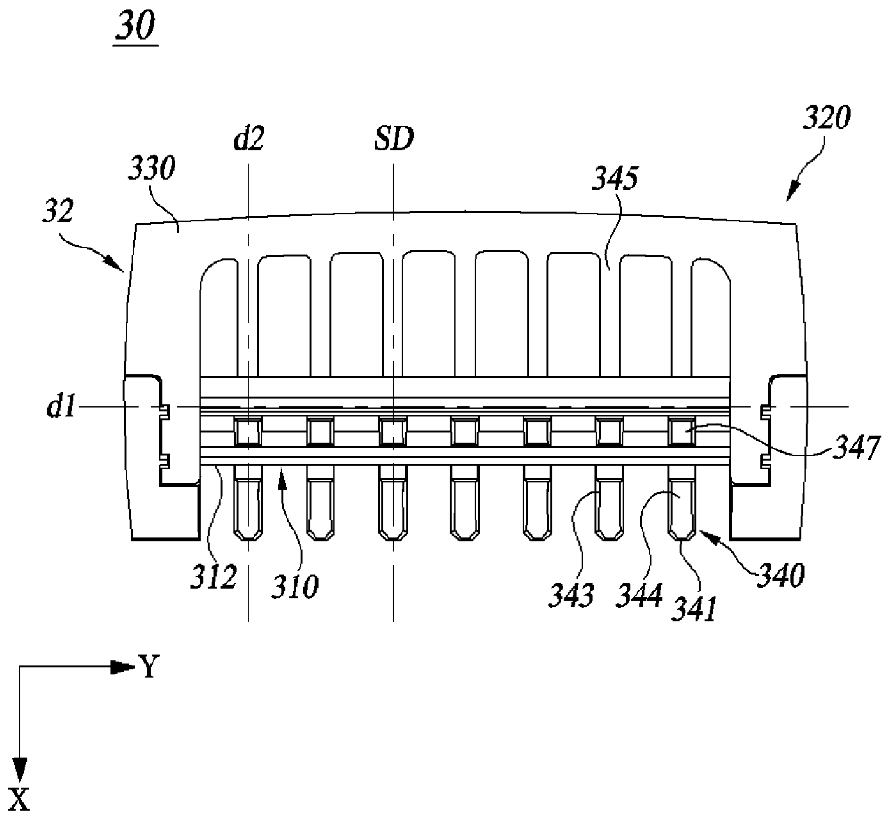
FIG. 14 is a front view illustrating a razor cartridge according to the other embodiment of the present disclosure.
Figure 15:
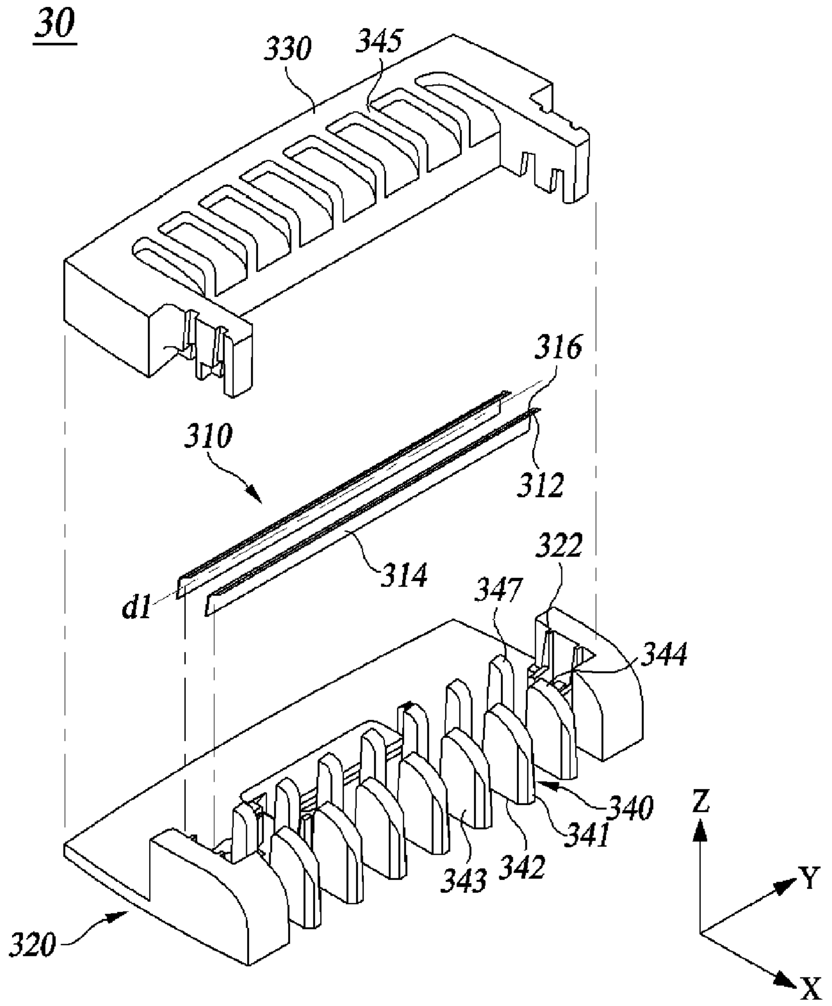
FIG. 15 is an exploded perspective view illustrating the razor cartridge according to the other embodiment of the present disclosure.

Referring to FIGS. 14 and 15, a razor cartridge 30 may include a blade housing 32 and at least one shaving blade 310.

The blade housing 32 may include a receiving base 320, a cap 330, and a plurality of comb elements 340.

At least one shaving blade 310 may be accommodated in the blade housing 32 while being arranged in a first direction d1. In this case, the first direction d1 may be perpendicular to a shaving direction SD. However, the present disclosure is not limited thereto.

At least one shaving blade 310 may include a bending blade or a welded blade.

The receiving base 320 may receive at least one shaving blade 310 arranged in the first direction d1.

The cap 330 may cover at least a portion of the receiving base 320 in a state where the receiving base 320 receives at least one shaving blade 310.

The cap 330 may support both ends of at least one shaving blade 310, or may be fixed to cover the area of the receiving base 320 located in back of at least one shaving blade 210 while supporting both ends of at least one shaving blade 310. Thereby, at least one shaving blade 310 may be firmly maintained in the blade housing 32.

The plurality of comb elements 340 may extend toward the front of the receiving base 320, and at least some of the plurality of comb elements 340 may be disposed in front of at least one shaving blade 310.

The plurality of comb elements 340 may arrange a user's hair using a space between the comb elements 340 during shaving. The plurality of comb elements 340 may include head portions 341 formed on free ends of the plurality of comb elements 340.

The head portion 341 may have a shape that becomes narrower in width toward the free end of the head portion 341. Thereby, the hair can be more effectively arranged.

On the other hand, the plurality of comb elements 340 may extend toward the front of the receiving base 320 in the second direction d2. In this case, the second direction d2 may be substantially parallel to the shaving direction SD, but the present disclosure is not limited thereto.

The plurality of comb elements 340 each may include a top surface 344. The top surfaced 344 may be spaced apart from the cutting edge 312.

The top surface 344 may define a shaving plane by contacting a user's skin. Thus, the hair may be cut by the cutting edge 312 at a position spaced apart from the shaving plane.

The plurality of comb elements 340 according to another embodiment of the present disclosure may include a plurality of front combs 343, a plurality of middle combs 347, and a plurality of rear combs 345. In this case, the top surfaces 344 of the plurality of comb elements 340 may include first top surfaces formed on the plurality of front combs 343, second top surfaces formed on the plurality of middle combs 347, and third top surfaces formed on the plurality of rear combs 345. The shaving plane may be defined by the first top surface, the second top surface, and the third top surface.

The cutting edge 312 of each of the shaving blades 310 may have the same protrusion value with respect to the shaving plane. For example, the protrusion value of the cutting edge 312 may be −1.0 mm, but the present disclosure is not limited thereto.

On the other hand, each of the plurality of front combs 343, the plurality of middle combs 347, and the plurality of rear combs 345 may protrude 3.6 mm or more from a surface of the receiving base 320. In this case, the protrusion value of the cutting edge 312 of the shaving blade 310 may be −1.0 mm. Although the protrusion heights of the plurality of front combs 343, the plurality of middle combs 347, and the plurality of rear combs 345 may be equal to each other, the present disclosure is not limited thereto.

The plurality of front combs 343 may be formed on the receiving base 320 in front of at least one shaving blade 310, and may extend in a second direction d2.

The plurality of front combs 343 may be areas disposed at front positions on the plurality of comb elements 340, and each may include at least a portion of the top surface 344.

The plurality of middle combs 347 may be formed on the receiving base 320 between the plurality of shaving blades 310. Thereby, it is possible to prevent a user's skin from being excessively pressed by a space between the plurality of shaving blades 310. Thereby, the safety risk of cutting the pressed skin by the shaving blade 310 can be minimized.

The plurality of middle combs 347 may be areas disposed at middle positions on the plurality of comb elements 340, and may be disposed to correspond in position to the plurality of front combs 343.

The plurality of front combs 343 and the plurality of middle combs 347 may be formed by injection on the receiving base 320. In this case, the plurality of front combs 343 and the plurality of middle combs 347 may be formed integrally with the receiving base 320.

The plurality of rear combs 345 may be formed on the cap 330 in back of at least one shaving blade 310, and may extend in the second direction d2.

The plurality of rear combs 345 may be areas disposed at rear positions on the plurality of comb elements 340, and the plurality of rear combs 345 may be disposed to correspond in position to the plurality of front combs 343.

Since the plurality of front combs 343 are formed on the receiving base 320, the space between the comb elements 340 may be opened in front of the foremost shaving blade 310.

To be more specific, the plurality of front combs 343 may be formed on the receiving base 320 such that the space between the comb elements 340 is opened in front of the foremost shaving blade 310.

Thereby, the user's hair may contact the foremost shaving blade 310 in the erected state without being interfered by the comb element 340, thus allowing the hair to be effectively cut.

On the other hand, the plurality of middle combs 347 are required only when the razor cartridge 30 includes a plurality of shaving blades 310. Therefore, if the razor cartridge 30 includes only one shaving blade 310, the shaving plane may be defined only by the first top surface and the third top surface. In this case, the protrusion value of the cutting edge 312 may be −1.0 mm or less.

Although FIGS. 14 and 15 show that the plurality of comb elements 340 include the front combs 343, the middle combs 347, and the rear combs 345, the present disclosure is not limited thereto.

For example, the plurality of comb elements 340 may include only the front combs 343 without the rear comb 345, or may include only the front combs 343 and the middle combs 347.

When the plurality of comb elements 340 include only the front combs 343 without the rear comb 345, the shaving plane may be defined by the first top surface formed on the front comb 343 and the top surface of the cap 330 located in back of at least one shaving blade 310. In this case, the protrusion value of the cutting edge 312 may be −1.0 mm or less.

When the plurality of comb elements 340 include only the front combs 343 and the middle combs 347, the shaving plane may be defined by the first top surface formed on the front comb 343, the second top surface formed on the middle comb 347, and the top surface of the cap 330 located in back of at least one shaving blade 310. In this case, the protrusion value of the cutting edge 312 may be −1.0 mm or less.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATIONS

The application claims priority to Korean Patent Application No. 10-2020-0029720, filed Mar. 10, 2020, the disclose of which is incorporated herein by reference.

| REFERENCE NUMERALS | |
|---|---|
| 10: | razor cartridge |
| 12: | blade housing |
| 14: | washing hole |
| 110: | shaving blade |
| 112: | cutting edge |
| 114: | base portion |
| 116: | edge portion |
| 120: | receiving base |
| 122: | receiving protrusions |
| 124: | teeth |
| 130: | cap |
| 140: | comb elements |
| 141: | head portion |
| 142: | bottom surface |
| 144: | top surface |
| 243: | front combs |
| 245: | rear combs |
| 247: | middle combs |
| SP: | shaving plane |
| PL: | normal line |
| BL: | extension direction of the base portion |
| EL: | extension direction of the cutting edge |
| CP: | cutting edge plane |

What is claimed is:

1. A razor cartridge comprising:

at least one shaving blade comprising a base portion and an edge portion including a cutting edge, at least a portion of the at least one shaving blade having a bent area;

a receiving base comprising a cap-facing surface, the cap-facing surface receiving the base portion; and a cap covering at least a portion of the receiving base, the cap comprising a third surface and a plurality of comb elements extending toward a front of the receiving base, each of the plurality of comb elements comprising:

a first surface facing the cap-facing surface of the receiving base, a second surface comprising a skin facing portion and a forward portion opposing the skin facing portion, the skin facing portion opposing the first surface, the forward portion disposed in front of the at least one shaving blade, the skin facing portions of the second surfaces of the plurality of comb elements defining a shaving plane, the third surface disposed behind the at least one shaving blade, the first surfaces coupled to both of the forward portions of the second surfaces and the third surface, the first surfaces, the forward portions of the second surfaces, and the third surface and the cap-facing surface of the receiving base defining at least one receiving hole through which the at least one shaving blade passes, and a plurality of washing holes passing the third surface such that at least part of a debris of hair cut by the at least one shaving blade is washed away through the plurality of washing holes, the plurality of comb elements defining a plurality of inter-element openings between neighboring ones of the comb elements, each of the inter-element openings having a front-facing open end defined by the forward portions of the second surfaces of the neighboring ones of the comb elements, each of the plurality of washing holes being dimensioned and positioned to be aligned with a corresponding one of the inter-element openings to provide a passage for washing away at least part of the debris of hair cut by the at least one shaving blade, and the forward portions at least partially define respective free ends of the plurality of comb elements and each of the free ends are not connected to each other.

2. The razor cartridge of claim 1, wherein the at least one shaving blade comprises a plurality of shaving blades arranged side by side.

3. The razor cartridge of claim 2, wherein the cutting edge of each of the plurality of shaving blades has a same negative protrusion value with respect to the shaving plane.

4. The razor cartridge of claim 3, wherein the cutting edge extends from the bent area in an extension direction thereof, and wherein an angle between the extension direction of the cutting edge and the shaving plane ranges from 10 degrees to 25 degrees.

5. The razor cartridge of claim 2, wherein a distance between a cutting edge of a shaving blade of the plurality of shaving blades and a cutting edge of another shaving blade of the plurality of shaving blades neighboring the shaving blade is greater than a distance between the skin facing portion of the second surface and a cutting edge plane connecting cutting edges of the plurality of shaving blades.

6. The razor cartridge of claim 1, wherein the receiving base comprises a plurality of receiving protrusions arranged on the cap-facing surface of the receiving base adjacent to the at least one shaving blade in a direction where the at least one shaving blade extends, and the base portion is at least partially accommodated in the plurality of receiving protrusions.

7. The razor cartridge of claim 1, wherein the base portion extends from the bent area in an extension direction thereof, and wherein the extension direction of the base portion is not parallel to a normal line of the shaving plane.

8. The razor cartridge of claim 1, wherein the at least one shaving blade has a first longitudinal axis defining a first direction, each of the plurality of comb elements having second longitudinal axes that collectively define a second shaving direction that is not perpendicular to the first direction, and an angle between the first direction and the second shaving direction ranges from 70 degrees to 89 degrees.

9. The razor cartridge of claim 1, wherein each of the inter-element openings extend across an entirety of the cap-facing surface of the receiving base from the front of the receiving base to the third surface of the cap.

10. The razor cartridge of claim 1, wherein the plurality of comb elements are provided in number N (N being a natural number greater than 1), and wherein the plurality of inter-element openings and the plurality of washing holes are each provided in number N−1.

* * * * *